(12) United States Patent
Metz

(10) Patent No.: US 10,356,853 B2
(45) Date of Patent: Jul. 16, 2019

(54) INFRARED TEMPERATURE SENSING IN INDUCTION COOKING SYSTEMS

(71) Applicant: CookTek Induction Systems, LLC, Carrollton, TX (US)

(72) Inventor: Reinhard Metz, Wheaton, IL (US)

(73) Assignee: COOKTEK INDUCTION SYSTEMS, LLC, Carrollton, TX (US)

( * ) Notice: Subject to any disclaimer, the term of this patent is extended or adjusted under 35 U.S.C. 154(b) by 235 days.

(21) Appl. No.: 15/250,439

(22) Filed: Aug. 29, 2016

(65) Prior Publication Data

US 2018/0063892 A1 Mar. 1, 2018

(51) Int. Cl.
*H05B 6/12* (2006.01)
*H05B 6/06* (2006.01)
*G01J 5/02* (2006.01)
*G01J 5/04* (2006.01)
*H05B 6/08* (2006.01)

(52) U.S. Cl.
CPC ............... *H05B 6/062* (2013.01); *G01J 5/02* (2013.01); *G01J 5/041* (2013.01); *H05B 6/1281* (2013.01)

(58) Field of Classification Search
CPC .......... H05B 6/06; H05B 6/062; H05B 6/065; H05B 6/12; H05B 6/1209; H05B 6/1227; H05B 6/1245; H05B 6/1263; H05B 6/1281; G01J 5/0003; G01J 5/02; G01J 5/0275;
(Continued)

(56) References Cited

U.S. PATENT DOCUMENTS 3,530,499 A 9/1970 Schroeder
3,615,365 A 10/1971 McCunn
(Continued)

FOREIGN PATENT DOCUMENTS

EP 0919326 6/1999
JP H103184295 8/1991
(Continued)

OTHER PUBLICATIONS

Alibaba.com, Buffet Induction Food Warmer/Table Top Food Warmer, Accessed on Nov. 26, 2014 (3 pages).
(Continued)

*Primary Examiner* — Hung D Nguyen
(74) *Attorney, Agent, or Firm* — Michael Best & Friedrich LLP

(57) ABSTRACT

An induction cooking system. The induction cooking system includes a base, one or more side walls, an induction coil, and an infrared temperature sensor. The base includes a base surface associated therewith. The base surface includes a window. The window is disposed within the base surface. The one or more side walls define a well above the base surface. The well is configured to receive a vessel disposed above the base surface. The induction coil is disposed within the base. The induction coil defines a first surface that is disposed below the base surface. The induction coil also defines a second surface that is disposed opposite from the first surface. The induction coil further defines an aperture disposed adjacent to the window and extending from a first surface toward a second surface of the induction coil. The infrared temperature sensor is disposed adjacent to the window and within the aperture.

19 Claims, 6 Drawing Sheets

(58) Field of Classification Search
CPC ......... G01J 5/0285; G01J 5/041; G01J 5/046; G01J 5/0803
USPC ................... 219/620, 621, 622, 625, 627
See application file for complete search history.

(56) References Cited

U.S. PATENT DOCUMENTS

| | | |
|---|---|---|
| 3,715,550 A | 2/1973 | Hamden, Jr. et al. |
| 3,719,789 A | 3/1973 | Hamden, Jr. et al. |
| 3,732,504 A | 5/1973 | Levinson |
| 3,742,174 A | 6/1973 | Hamden, Jr. |
| 3,742,178 A | 6/1973 | Hamden, Jr. |
| 3,742,179 A | 6/1973 | Hamden, Jr. |
| 3,761,667 A | 9/1973 | Walden |
| 3,781,504 A | 12/1973 | Harnden, Jr. |
| 3,786,220 A | 1/1974 | Harnden, Jr. |
| 3,966,426 A | 6/1976 | McCoy et al. |
| 4,110,588 A | 8/1978 | Holz |
| 4,464,553 A | 8/1984 | Ikeda |
| 4,529,869 A | 7/1985 | Ekstrom, Jr. |
| 4,549,056 A | 10/1985 | Okatsuka et al. |
| 4,596,236 A | 6/1986 | Eide |
| 4,646,935 A | 3/1987 | Ulam |
| 4,749,836 A | 6/1988 | Matsuo et al. |
| 4,820,891 A | 4/1989 | Tanaka et al. |
| 5,134,265 A | 7/1992 | Dickens et al. |
| 5,270,511 A | 12/1993 | Iguchi |
| 6,140,617 A | 10/2000 | Berkcan et al. |
| 6,265,712 B1 | 7/2001 | Charlier et al. |
| 6,300,623 B1 | 10/2001 | Charlier et al. |
| 6,320,169 B1 | 11/2001 | Clothier |
| 6,369,386 B1 | 4/2002 | Charlier et al. |
| 6,403,932 B1 | 6/2002 | Nelson et al. |
| 6,417,496 B1 | 7/2002 | Bates et al. |
| 6,555,793 B2 | 4/2003 | Griffiths et al. |
| 6,765,209 B1 | 7/2004 | Kassovski et al. |
| 6,861,628 B2 | 3/2005 | Owens et al. |
| 6,894,255 B2 | 5/2005 | Fujii et al. |
| 6,904,378 B2 | 6/2005 | Schilling et al. |
| 6,953,919 B2 | 10/2005 | Clothier |
| 7,102,109 B2 | 9/2006 | Niiyama et al. |
| 7,129,449 B2 | 10/2006 | Tominaga et al. |
| 7,355,150 B2 | 4/2008 | Baarman et al. |
| 7,402,781 B2 | 7/2008 | Kondo et al. |
| 7,550,725 B2 | 6/2009 | Hollander et al. |
| 7,573,005 B2 | 8/2009 | Clothier |
| 7,688,036 B2 | 3/2010 | Yarger et al. |
| 7,731,689 B2 | 6/2010 | Prisco et al. |
| 7,790,103 B2 | 9/2010 | Shah et al. |
| RE42,513 E | 7/2011 | Clothier |
| 7,980,171 B2 | 7/2011 | Groll |
| 8,021,768 B2 | 9/2011 | Ge |
| 8,212,192 B2 | 7/2012 | Tominaga et al. |
| 8,350,197 B2 | 1/2013 | Tominaga et al. |
| 8,357,882 B2 | 1/2013 | Jones et al. |
| 8,389,912 B2 | 3/2013 | Niiyama et al. |
| 8,450,665 B2 | 5/2013 | Ogasawara et al. |
| 8,734,935 B2 | 5/2014 | Striegler |
| 8,796,599 B2 | 8/2014 | Sakakibara et al. |
| 8,853,599 B2 | 10/2014 | Kusaka et al. |
| 9,066,374 B2 | 6/2015 | Graber et al. |
| 2001/0001047 A1 | 5/2001 | Nelson et al. |
| 2002/0027175 A1 | 3/2002 | Capp |
| 2003/0062362 A1 | 4/2003 | Tateishi |
| 2003/0192881 A1 | 10/2003 | Bassill et al. |
| 2004/0070482 A1 | 4/2004 | Golan |
| 2004/0112940 A1 | 6/2004 | Caddell, Jr. et al. |
| 2004/0149736 A1 | 8/2004 | Clothier |
| 2005/0045624 A1 | 3/2005 | Groll |
| 2005/0242088 A1 | 11/2005 | Takada et al. |
| 2005/0271894 A1 | 12/2005 | Groll |
| 2006/0049178 A1 | 3/2006 | Tominaga et al. |
| 2006/0081615 A1 | 4/2006 | Kataoka et al. |
| 2006/0091135 A1 | 5/2006 | Kondo et al. |
| 2006/0272494 A1 | 12/2006 | Cetinkunt et al. |
| 2006/0289487 A1 | 12/2006 | Tarenga |
| 2007/0000915 A1 | 1/2007 | Cheng |
| 2007/0267107 A1 | 11/2007 | Michler |
| 2007/0278216 A1 | 12/2007 | Tominaga et al. |
| 2009/0065500 A1 | 3/2009 | England et al. |
| 2009/0188909 A1 | 7/2009 | Jones et al. |
| 2009/0194329 A1 | 8/2009 | Guimerans et al. |
| 2009/0321425 A1 | 12/2009 | Meier |
| 2010/0012232 A1 | 1/2010 | John |
| 2010/0051608 A1 | 3/2010 | Tominaga et al. |
| 2010/0065550 A1 | 3/2010 | Tominaga et al. |
| 2010/0065551 A1 | 3/2010 | Tominaga et al. |
| 2010/0102054 A1 | 4/2010 | Fujinami et al. |
| 2010/0108690 A1 | 5/2010 | Groll |
| 2010/0176120 A1 | 7/2010 | Watanabe et al. |
| 2010/0181299 A1 | 7/2010 | Niiyama et al. |
| 2010/0230401 A1 | 9/2010 | Miyauchi et al. |
| 2010/0243641 A1 | 9/2010 | Ogasawara et al. |
| 2011/0000904 A1 | 1/2011 | Sakakibara et al. |
| 2011/0073588 A1 | 3/2011 | Kusaka et al. |
| 2011/0180530 A1 | 7/2011 | Jeanneteau et al. |
| 2011/0180531 A1 | 7/2011 | Shinha |
| 2011/0198342 A1 | 8/2011 | Fujinami et al. |
| 2011/0259877 A1 | 10/2011 | Watanabe et al. |
| 2011/0284524 A1 | 11/2011 | Okuda et al. |
| 2011/0315674 A1 | 12/2011 | Fujinami et al. |
| 2011/0315675 A1 | 12/2011 | Sakakibara et al. |
| 2012/0000904 A1 | 1/2012 | Hashimoto et al. |
| 2012/0024840 A1 | 2/2012 | Lee et al. |
| 2012/0118874 A1 | 5/2012 | Williams et al. |
| 2012/0138597 A1 | 6/2012 | Quella et al. |
| 2012/0249310 A1 | 10/2012 | Hotaling |
| 2012/0268117 A1 | 10/2012 | Romano et al. |
| 2012/0294990 A1 | 11/2012 | Graber et al. |
| 2013/0119049 A1 | 5/2013 | Graber et al. |
| 2014/0157998 A1* | 6/2014 | Roever ............... H05B 6/1245 219/663 |
| 2015/0017287 A1 | 1/2015 | Sevim |
| 2015/0373787 A1 | 12/2015 | Visher et al. |

FOREIGN PATENT DOCUMENTS

| | | |
|---|---|---|
| JP | 2003249342 | 9/2003 |
| JP | 2011023314 | 2/2011 |
| KR | 1020130094639 | 8/2013 |

OTHER PUBLICATIONS

Alto-Shaam, Inc., Food Wells, <http://products.alto-shaam.com/c-13-food-wells.aspx>, Accessed on Nov. 26, 2014 (2 pages).
Anonymous, "How the steam table turns," Foodservice Equipment & Supplies Specialist; Sep. 25, 1996; 49, 10; ABI/INFORM Complete, p. 79.
Bendall, "Buying Buffet Equipment," Jun. 1, 2009 (3 pages).
Bendall, "High Speed Cooking," Jul. 1, 2010 (3 pages).
Bendall, "How to Buy Buffet Equipment," Oct. 1, 2011 (2 pages).
Bendall, "How to buy holding and serving equipment," Dec. 14, 2012 (2 pages).
Bob Ingram, "Foodservice Equipment Trends: Advances in Hot Foods, Warewashing, Scales, and More," Jun. 30, 2010, Progressive Grocer, pp. 1-2.
Bob Ingram, "The simple life," Oct. 1, 2006, Progressive Grocer, pp. 1-6.
CookTek Induction Systems, LLC; 650 Watt Drop-In Inductions Buffet specifications.
Duke Manufacturing, "DRI-Channel Units for Hot Holding," Accessed on Nov. 26, (1 page).
Duke Manufacturing, "Drop-Ins/Slide-ins,"<http://www.dukemfg.com/products/Default.aspx?Category=WEBSITE_DROPINS>Accessed on Nov. 26, 2014 (4 pages).
Eagle Group, "Hot Food Tables," 2013 (16 pages).
Food Service Consultants Society International, Mar. 2012—Direct Connection, <http://www.fcsi.org/?201203DirectConnect> Accessed on Nov. 26, 2014.
Foodservice Equipment Reports, "Gallery: Induction," Feb. 3, 2014, (3 pages).

(56) References Cited

OTHER PUBLICATIONS

Foodservice Equipment Reports, "Mar. 2013 Products, An oil filtration system, induction food holding wells and a knife storage system are featured this month" Mar. 1, 2013, (3 pages).

Frable, Foster, Jr., "Good riddance to stainless-steam-table pans for hot-food display; bring on new methods," Nation's Restaurant News; Oct. 18, 1999; 33, 42; ABI/INFORM Complete, p. 29.

Frable, Foster, Jr., "Innovation leads to a better way to maintain foods' taste, temperature on holding systems," Nation's Restaurant News; Aug. 21, 2006; 40, 34; ABI/INFORM Complete, p. 18.

Ingram, Bob, "More of the Green Stuff," Mar. 2011 (5 pages).

Kim Ann Zimmermann, "The heat is on: healed merchandisers are becoming more flexible, energy efficient and stylish; Heated Merchandisers", Feb. 1, 2011, p. 145(4); vol. 77; No. 2; ISSN: 1094-1088.

McGuire, "A Really Easy Way to Make Commercial Steam Tables Energy Efficient," eTundra.com, Jul. 13, 2012.

National Restaurant Association, "National Restaurant Association Announces 2012 Kitchen Innovations Award Recipients, Esteemed Award Honors Industry's Groundbreaking Foodservice Equipment in an Exclusive Pavilion at NRA Show," Feb. 8, 2012, (3 pages).

Pac Rim Blogger, "CookTek's SINAQUA Induction Holding Well System Makes Top Ten Finalist in the FCSI Showcase," Pacific Rim Rep Group, Inc., Apr. 20, 2012.

Snyder et al., "Correct hot and cold food holding," Foodservice Equipment & Supplies; Jul. 2000; 53, 8; ABI/INFORM Complete, p. 49.

The Vollrath Company, "The Vollrath® Company Acquires Polar Ware®/ Stoelting®, Acquisition Extends Vollrath's Offering in Array of Food Service Categories," May 21, 2012.

The Webstaurant store; <http://www.webstraurantstore.com/5305/steam-tables-and-cold-food-tables-wells.html>.

Thurmaduke, Well Waterless Food Warmer Serving Counter Model E-3 SR, Accessed on Nov. 26, 2014 (6 pages).

Therma-Kool, "CookTek Induction Systems SinAqua Induction Food Holding Wells", <http://fesmag.com/products/product-showcase/serving-equipment/cooktek-induction-systems-sinaqua-inductionfood-holding-wells-detail> Accessed on Nov. 26, 2014.

Vollrath, "Countertop Warming and Display Equipment," Accessed on Nov. 26, 2014 (3 pages).

Vollrath, "Mirage® Induction Rethermalizer FAQs," Accessed on Nov. 26, 2014 (2 pages).

Vollrath, "Vollrath's Direct Contact Heating System Warms More Efficiently," Dec. 24, 2012.

Vollrath, Catalog Countertop Warming, pp. 34-76.

Vollrath, Induction Buffet Table, < http://vollrath.com/Induction-Buffet-Table-1344.htm?PrintPage=yes&FB_Values=&&&> Accessed on Nov. 26, 2014 (3 pages).

Vollrath, Steam Table Pans, (18 pages).

Wells, "Wells MOD-300TDM," < http://www.missionrs.com/wells-mod-300tdm-drop-in-food-warmer-3-well-fullsize-208-240v.html>, Accessed on Nov. 26, 2014 (3 pages).

Winston Industries, "Winston Industries Expands Product Line with SerVap," May 18, 2006, (1 page).

Winston Industries, "Winston Industries Expands Product Line with SerVap," Oct. 2007, (1 page).

British Stainless Steel Association, Frequently Asked Questions Page, "Is stainless steel non-magnetic?" located at: <http://www.bssa.org.uk/faq.php?id=24>, accessed Dec. 23, 2013, 2 pages.

hittp://www.e-sun.cn/china-manufacturer/temperature-sensing/non-contact-infrared-thermostat; Infrared Thermometers (Temperature Sensors Measurement); Series product models: EM520, EM528; Nov. 7, 2011.

http://www.omega.com/literature/transactions/volume1/products2.html; Nov. 7, 2011; Products & Applications.

hittp://www.industrialheating.com/Articles/Feature_Article/BNP GU1D_9-5-2006_A_ 100 . . . ; Nov. 7, 2011; Measuring Temperature in Induction-Heating Processes Using Infrared Temperature Sensors; Jeff Kresch, Vern Lappe, Aug. 8, 2007.

hittp://www.processsensors.com/appbl_II/?cat=5; Welcome to PSC's Blog; Category Archives: Non Contact Infrared Temperature Sensing.

International Search Report and Written Opinion for Application No. PCT/US2017/048596 dated Jan. 5, 2018 (11 pages).

\* cited by examiner

INFRARED TEMPERATURE SENSING IN INDUCTION COOKING SYSTEMS

BACKGROUND

The disclosure generally relates to induction cooking systems, and in particular, temperature sensing in induction cooking systems.

SUMMARY

In one embodiment, the disclosure provides an induction cooking system. The induction cooking system includes a base, one or more side walls, an induction coil, and an infrared temperature sensor. The base includes a base surface associated therewith. The base surface includes a window. The window is disposed within the base surface. The one or more side walls define a well above the base surface. The well is configured to receive a vessel disposed above the base surface. The induction coil is disposed within the base. The induction coil defines a first surface that is disposed below the base surface. The induction coil also defines a second surface that is disposed opposite from the first surface. The induction coil further defines an aperture. The aperture is disposed adjacent to the window and extends from the first surface toward the second surface. The infrared temperature sensor is disposed adjacent to the window and within the aperture.

In another embodiment, the disclosure provides an induction cooking system. The induction cooking system includes a base, one or more side walls, an induction coil, an infrared temperature sensor, and an electronic controller. The base includes a base surface associated therewith. The base surface includes a window. The window is disposed within the base surface. The one or more side walls define a well above the base surface. The well is configured to receive a vessel disposed above the base surface. The induction coil is disposed within the base. The induction coil defines an aperture. The aperture is disposed adjacent to the window. The infrared temperature sensor is disposed adjacent to the window and within the aperture. The electronic controller is electrically coupled to the infrared temperature sensor. The electronic controller is configured to determine a compensated temperature measurement based at least in part on a material of the window and on a temperature measurement taken by the infrared temperature sensor.

Other aspects of the disclosure will become apparent by consideration of the detailed description and accompanying drawings.

Figure 1:
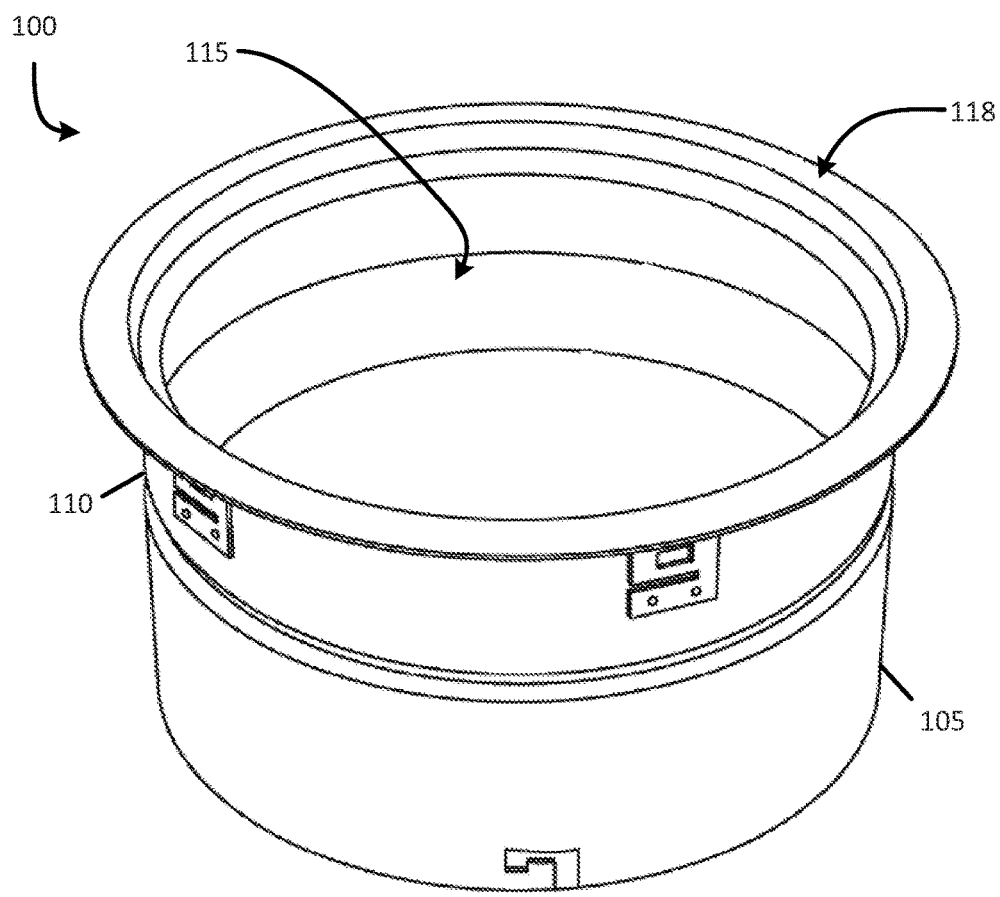
FIG. 1 is a perspective view of an induction cooking system, according to some embodiments of the disclosure.

The components in the drawings are not necessarily to scale, emphasis instead being placed upon clearly illustrating the principles of the disclosure.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

FIG. 1 is a perspective view of an induction cooking system 100, according to some embodiments of the disclosure. The dry well induction cooking system 100 includes a base 105 and one or more side walls 110 defining a well 115. Although illustrated as a cylinder, the induction cooking system 100 may be a variety of shapes and/or profiles, including but not limited to, a circle, a rectangle or a square.

Figure 2:
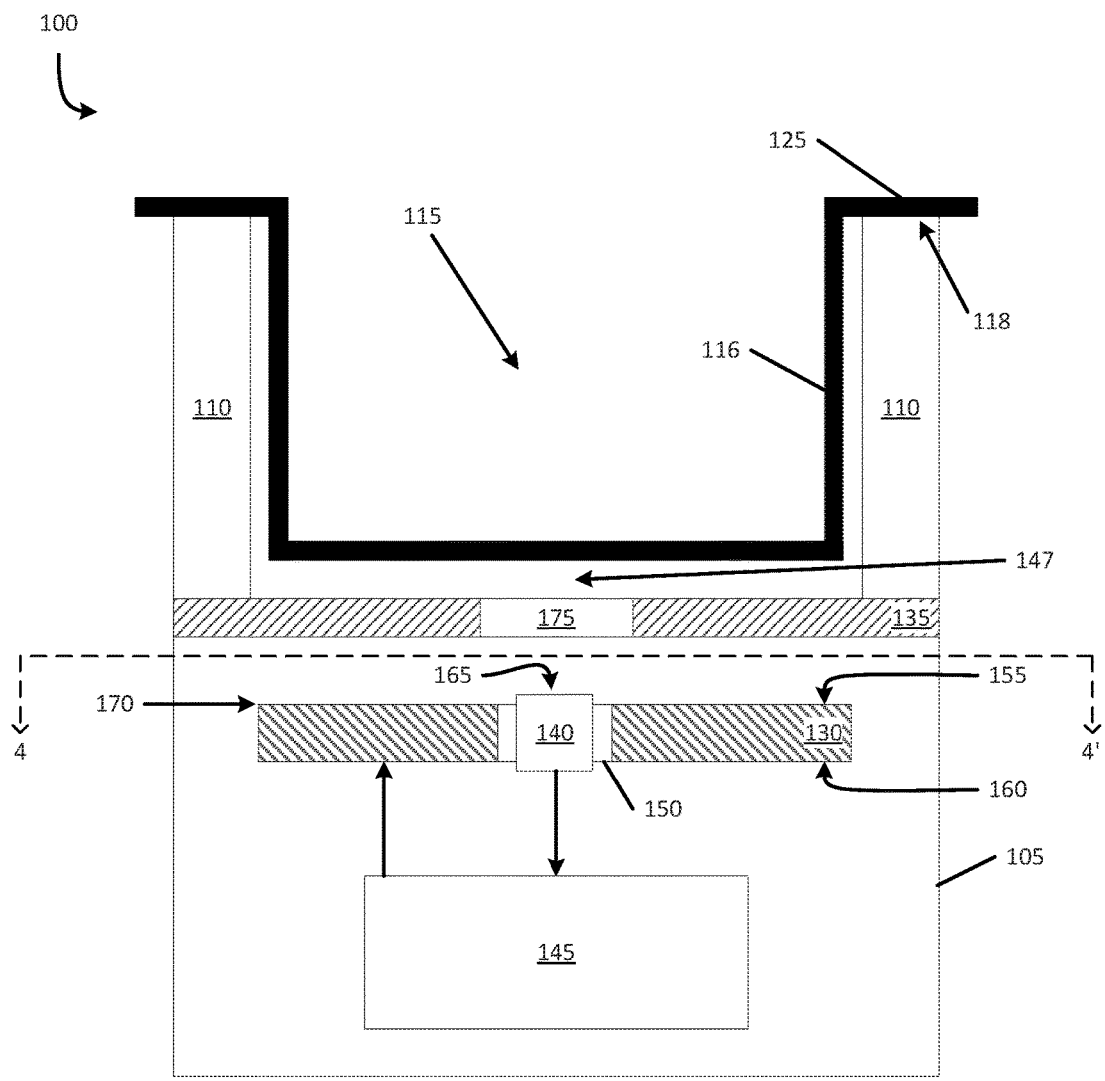
FIG. 2 is cross-sectional schematic side view of an induction cooking system taken along line 2-2' of FIG. 4, according to some embodiments of the disclosure.

The well 115 is configured to receive a vessel 116 such as, but not limited to, a pot or pan, e.g., a hotel pan (FIG. 2). In some embodiments, the vessel 116 is constructed of stainless steel. In such an embodiment, the vessel 116 may be made substantially of 300-series stainless steel (which has very low magnetic permeability). In other embodiments, the vessel 116 is made of another ferromagnetic material such as iron or a grade of steel (e.g., 400-series stainless steel) that is ferromagnetic.

FIG. 2 is cross-sectional schematic side view of the induction cooking system 100, according to some embodiments of the disclosure. As illustrated, the induction cooking system 100 can include a ledge 118. The vessel 116 includes a rim 125, which protrudes from the top edge of the vessel 116 and which is configured to align the vessel within the well 115 and to rest on the ledge 118 at the top portion of the well 115 such that the weight of the vessel 116 is supported by the rim 125 of the vessel 116 rather than the vessel bottom.

The base 105 includes, among other components, an induction coil 130, a base surface 135, an infrared temperature sensor 140, and an electronic controller 145. The induction coil 130 is configured to produce an oscillating magnetic field operating at, e.g., 20 to 50 kHz. In operation, the oscillating magnetic field induces a current in the vessel 116 placed near (or above) the base surface 135. The oscillating magnetic field heats the material of the vessel 116 by generating small eddy currents within the material as well as by causing oscillation of magnetic dipoles within the material.

The well 115 is configured to receive the vessel 116 disposed above and not in contact with the base surface 135. Specifically, a gap 147 exists between the bottom of the vessel 116 and the base surface 135.

The induction coil 130 defines, among other features, a first recess or aperture 150, a first surface 155, and a second surface 160. The first surface 155 is disposed adjacent (e.g., below) the base surface 135 and defines, among other features, a center 165 and a periphery 170. The second surface 160 is disposed opposite the first surface 155. The first aperture 150 extends from the first surface 155 to the second surface 160. In some embodiments, the first aperture 150 need not extend all the way from the first surface 155 to the second surface 160. In some embodiments, the first aperture 150 is located at the center 165 of the first surface 155, as illustrated in FIG. 2. The first aperture 150 is an advantageous location for placement of the infrared temperature sensor 140 since this region is free of wires from the induction coil 130.

In certain embodiments, the base 105 is sealed from the well 115 by the base surface 135 (e.g., to separate the coil and electronics from the cooking area). In some implementations, the base surface 135 includes a type of bulk molding compound (BMC). BMC is a glass-fiber reinforced thermoset polyester material.

The infrared temperature sensor 140 measures a temperature of the vessel 116 placed near (or above) the base surface 135 without requiring direct contact between the infrared temperature sensor 140 and the vessel 116. In the embodiment illustrated in FIG. 2, the infrared temperature sensor 140 is located within the first aperture 150 of the induction coil 130. The base surface 135, however, may block a portion of the infrared radiation emitted by the vessel 116 (e.g., the base surface 135 may block light with wavelength ranging generally from 0.75 micrometers to about 15 micrometers). In order to allow a portion of the total infrared radiation emitted by the vessel 116 to be sensed by the infrared temperature sensor 140, a window 175 may be provided within the base surface 135, where the window 175 includes material that is transparent to infrared wavelengths. In some embodiments, the window 175 includes a type of polyethylene plastic, which while it is naturally milky white is nevertheless sufficiently transparent to infrared wavelengths, particularly when only a relatively thin layer is used (e.g., between 1-2 millimeters). In other embodiments, the window 175 may include, but is not limited to, silicon or germanium. The window 175 is disposed adjacent the infrared temperature sensor 140 and enables the infrared temperature sensor 140 to sense a portion of the total infrared radiation emitted by the vessel 116. In the embodiment illustrated in FIG. 2, the window 175 is also disposed adjacent the first aperture 150 of the induction coil 130. The infrared temperature sensor 140 measures an amount of infrared radiation transmitted through the window 175 (by the vessel 116). In some embodiments, the infrared temperature sensor 140 determines a temperature measurement based at least in part on the amount of infrared radiation transmitted through the window 175.

Figure 3:
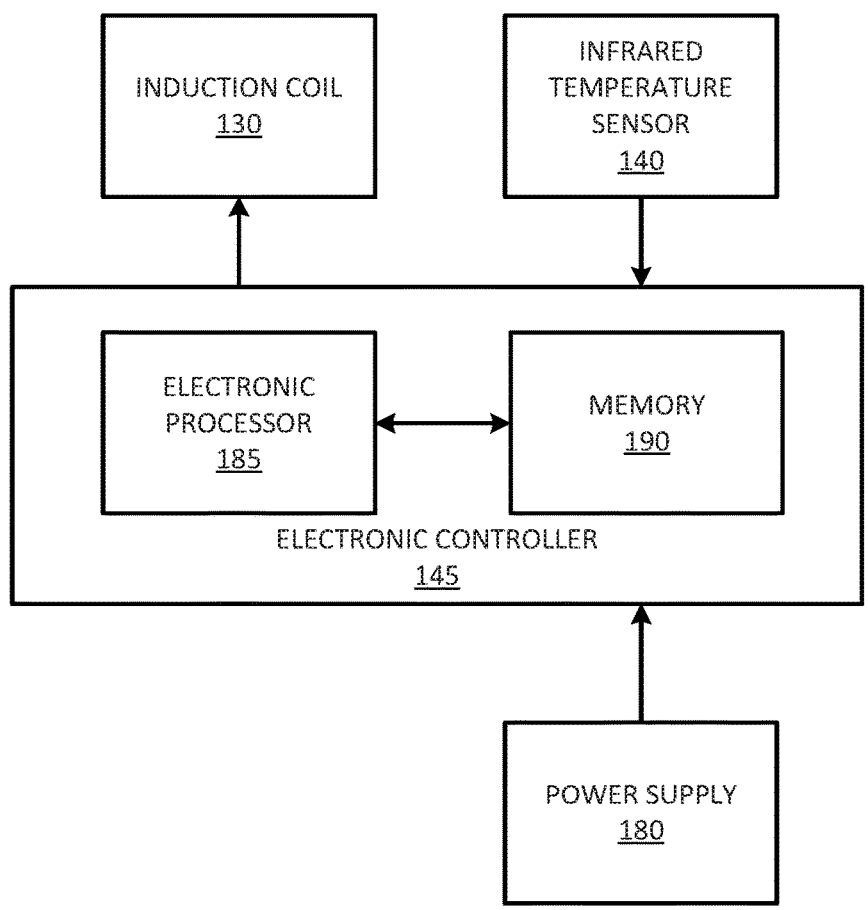
FIG. 3 is a block diagram of an induction cooking system, according to some embodiments of the disclosure.

FIG. 3 is a block diagram of an embodiment of the induction cooking system 100 including electronic controller 145. The electronic controller 145 may be communicatively (e.g., electrically) connected to a variety of modules or components of the induction cooking system 100. For example, in various embodiments the electronic controller 145 is connected to one or more of: the induction coil 130, the infrared temperature sensor 140, and a power supply 180. The electronic controller 145 includes combinations of hardware and software that are operable to, among other things, receive temperature measurements from the infrared temperature sensor 140 and regulate the oscillating magnetic field generated by the induction coil 130 based on the received temperature measurements.

In some embodiments, the electronic controller 145 includes a plurality of electrical and electronic components that provide power, operational control, and protection to the components and modules within the electronic controller 145 and/or the induction cooking system 100. For example, the electronic controller 145 includes, among other components, an electronic processor 185 (e.g., a microprocessor, a microelectronic controller, or another suitable programmable device) and a memory 190. The electronic processor 185 and the memory 190, as well as the various modules connected to the electronic controller 145, are connected by one or more control and/or data buses. The control and/or data buses are shown generally in FIG. 3 for illustrative purposes. The use of one or more control and/or data buses for the interconnection between and communication among the various modules and components would be known to a person skilled in the art in view of the disclosure described herein. In some embodiments, the electronic controller 145 is implemented partially or entirely on a semiconductor (e.g., a field-programmable gate array [FPGA] semiconductor) chip, such as a chip developed through a register transfer level (RTL) design process.

The memory 190 includes, for example, a program storage area and a data storage area. The program storage area and the data storage area can include combinations of different types of memory, such as read-only memory (ROM), random access memory (RAM) (e.g., dynamic RAM [DRAM], synchronous DRAM [SDRAM], etc.), electrically erasable programmable read-only memory (EEPROM), flash memory, a hard disk, an SD card, or other suitable magnetic, optical, physical, or electronic memory devices. The electronic processor 185 is connected to the memory 190 and executes software instructions that are capable of being stored in a RAM of the memory 190 (e.g., during execution), a ROM of the memory 190 (e.g., on a generally permanent basis), or another non-transitory computer readable medium such as another memory or a disc. Software included in the implementation of the induction cooking system 100 can be stored in the memory 190 of the electronic controller 145. The software includes, for example, firmware, one or more applications, program data, filters, rules, one or more program modules, and other executable instructions. The electronic controller 145 is configured to retrieve from memory and execute, among other things, instructions related to the control processes and methods described herein. In other constructions, the electronic controller 145 includes additional, fewer, or different components.

The power supply 180 supplies a nominal AC or DC voltage to the electronic controller 145 or other components or modules of the induction cooking system 100 (e.g., the induction coil 130, the infrared temperature sensor 140, etc.). The power supply 180 is powered by, for example, a power source having nominal line voltages between 100V and 240V AC and frequencies of approximately 50-60 Hz. The power supply 180 is also configured to supply lower voltages to operate circuits and components within the electronic controller 145 or the induction cooking system 100. In some embodiments, the electronic controller 145 adjusts an energy output of the induction coil 130 based at least in part on a temperature measurement taken by the infrared temperature sensor 140.

The material used in the window 175 can affect the accuracy of the temperature measurements taken by the infrared temperature sensor 140. In general, the amount of infrared radiation which impinges on the infrared temperature sensor 140 is less than the amount of infrared radiation which is emitted by a portion of the vessel 116, due to the window 175 in most cases transmitting less than 100% of the incident infrared light.

Thus, the difference between the amount of infrared radiation emitted by the vessel 116 and the amount of infrared radiation transmitted through the window 175 is based in part on the material used for the window 175, particularly the light transmission properties of the material in the infrared range. In various embodiments, the window 175 comprises a material which transmits a relatively high percentage of infrared light. Further, to compensate for losses which occur due to less than complete transmission of infrared radiation through the window 175, in some embodiments the electronic controller 145 is further operable to compensate for the effect of the material used in the window 175 on the accuracy of the temperature measurements taken by the infrared temperature sensor 140.

In some embodiments, the electronic controller 145 determines a compensated temperature measurement based on a temperature measurement taken by the infrared temperature sensor 140 and the material of the window 175. In some embodiments, the electronic controller 145 adjusts the energy output of the induction coil 130 based at least in part on the compensated temperature measurement. The electronic controller 145 may use an algorithm or correction factor to calculate the compensated temperature measurement. As an example, the electronic controller 145 may use a constant multiplicative factor, for example, when the material used in the window 175 contributes a relatively flat attenuation factor with respect to wavelength. As a further example, the electronic controller 145 may use a multiplicative correction that is a function of the temperature indicated by the infrared temperature sensor 140. For example, in some embodiments, the electronic controller 145 compensates using the following equation:

$$T_{compensated} = a + (x \times T_{measured}^2) \quad (1)$$

wherein,
$T_{compensated}$=compensated temperature,
a=additive constant,
x=function of the attenuation curve with respect to frequency, and
$T_{measured}$=temperature measured by the infrared temperature sensor 140.

Figure 4:
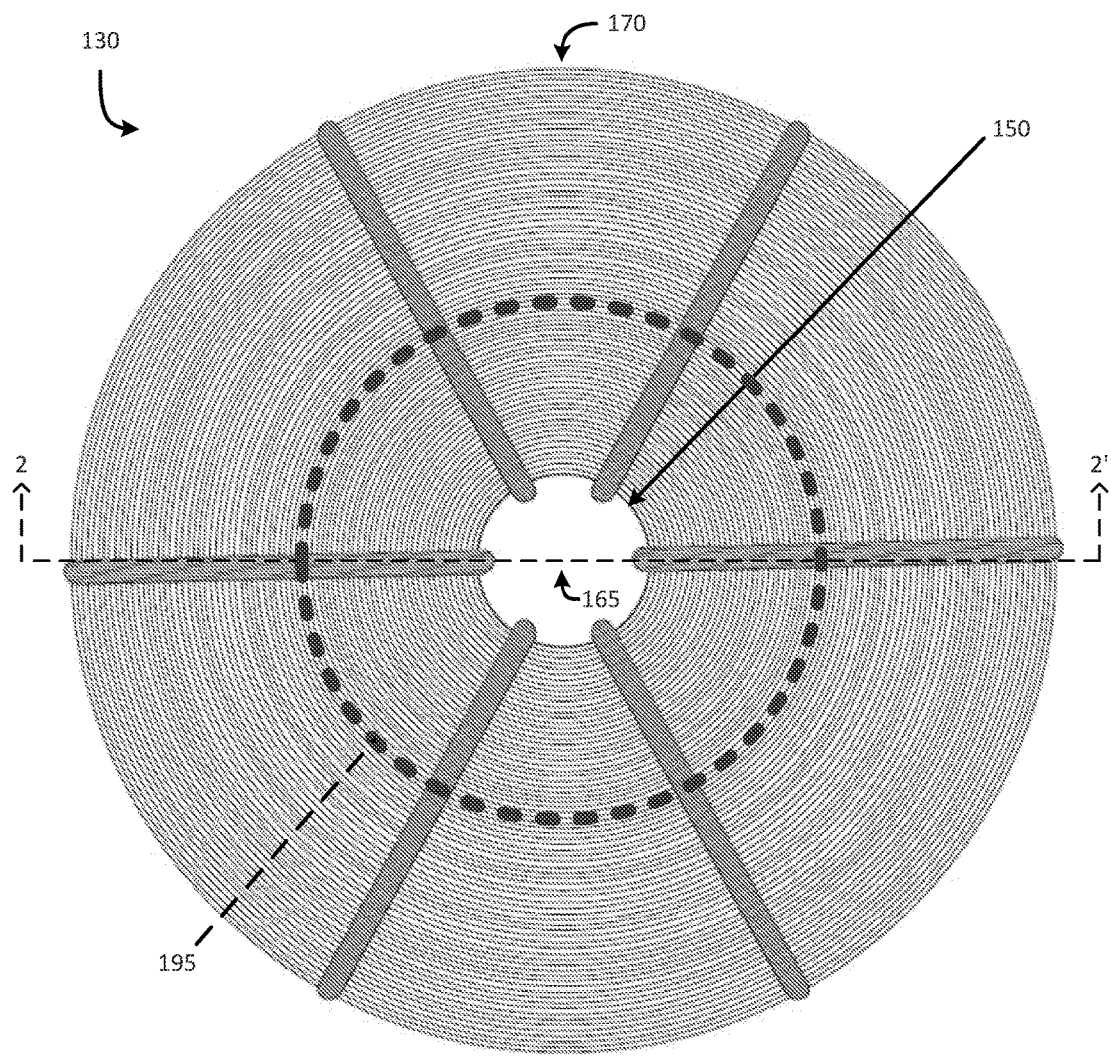
FIG. 4 is a top view of a first surface of an induction coil included in the induction cooking system illustrated in FIG. 3.

FIG. 4 illustrates a top view of the first surface 155 of the induction coil 130 according to the embodiment of FIG. 2. In some embodiments, the first and second surfaces 155, 160 are generally circular. In other embodiments, the first and second surfaces 155, 160 may be a variety of shapes, including but not limited to, rectangular or square. The accuracy of the infrared temperature sensor 140 increases when it is positioned closer to the area of the vessel 116 that emits the greatest amount of infrared radiation. As explained above, in some embodiments, such as the embodiment illustrated in FIG. 2, the infrared temperature sensor 140 may be disposed within the first aperture 150 at the center 165 of the first surface 155. However, the greatest amount of infrared radiation may not be emitted by the vessel 116 at the center 165 of the first surface 155. Instead, in some instances the induction coil 130 has the greatest magnetic field strength (and hence produces the greatest amount of infrared radiation) in what is referred to herein as a power ring region 195 (illustrated in FIG. 4 as a broken circular line). In some embodiments, where the first and second surfaces 155, 160 of the induction coil 130 are generally circular, the power ring region 195 is generally located midway between the center 165 and the periphery 170, as illustrated in FIG. 4.

Figure 5:
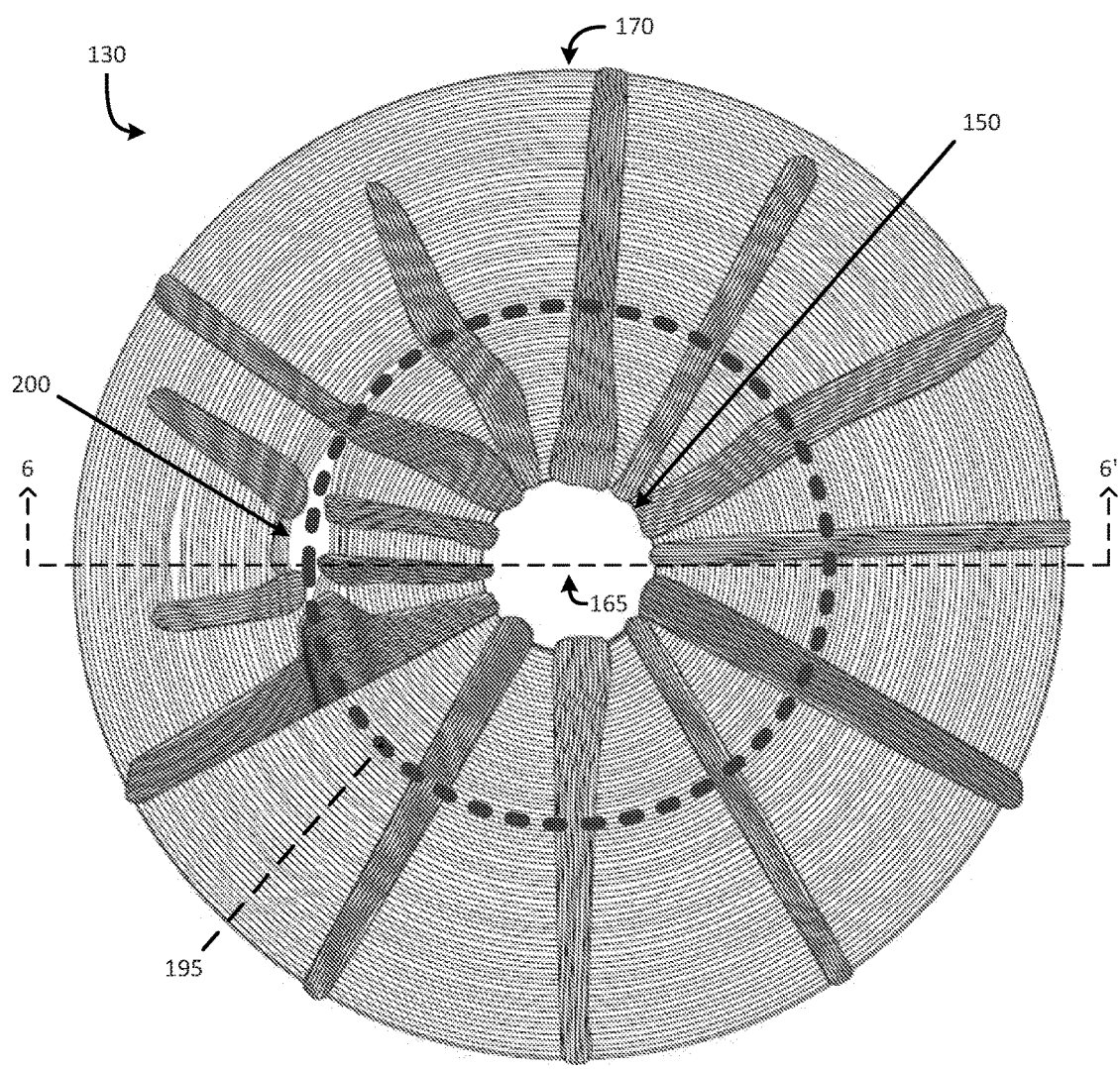
FIG. 5 is a top view of a first surface of an induction coil, according to some embodiments of the disclosure.

As illustrated in FIG. 5, in some embodiments the induction coil 130 further includes a second aperture 200 disposed between the first surface 155 and the second surface 160. Typically, induction coils are substantially symmetrical (e.g. having circular symmetry). In some embodiments, however, such as illustrated in FIG. 5, the induction coil includes some asymmetric portions in order to accommodate the second aperture 200. The second aperture 200 is also disposed between the center 165 and the periphery 170 of the first surface 155. In some embodiments, the second aperture 200 is disposed at the power ring region 195 of the induction coil 130. For example, in some embodiments, such as the embodiment illustrated in FIG. 5, where the first and second surfaces 155, 160 are generally circular, the second aperture 200 is disposed midway between the center 165 and the periphery 170. In some embodiments, the second aperture 200 is disposed at about a radial midpoint between the center 165 and the periphery 170. In some embodiments, the second aperture 200 is disposed at a radial midpoint between the center 165 and the periphery 170.

Figure 6:
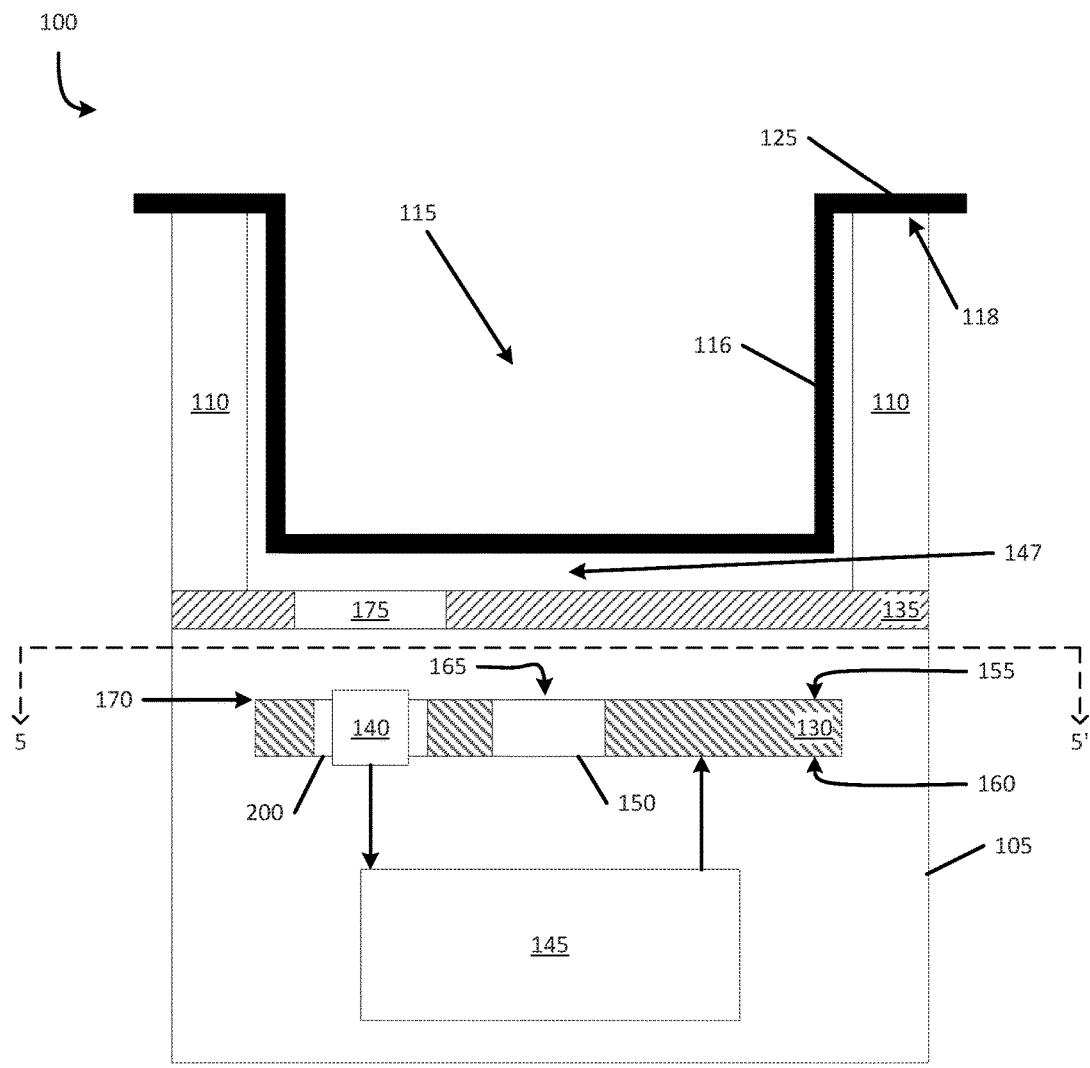
FIG. 6 is cross-sectional schematic side view of an induction cooking system including the induction coil illustrated in FIG. 5 taken along line 6-6' of FIG. 5.

As illustrated in FIG. 6, in some embodiments the induction cooking system 100 includes an induction coil 130 having a first aperture 150 and a second aperture 200. In such an embodiment, the infrared temperature sensor 140 may be disposed within the second aperture 200 of the induction coil 130. Positioning the infrared temperature sensor 140 within the second aperture 200 enables the infrared temperature sensor 140 to take temperature measurements at or near the power ring region 195. In the embodiment illustrated in FIG. 6, the window 175 is disposed adjacent the second aperture 200 of the induction coil 130.

Thus, the disclosure provides, among other things, systems and methods of measuring the temperature in induction cooking systems. Various features and advantages of the disclosure are set forth in the following claims.

What is claimed is:
1. An induction cooking system, comprising:
a base including a base surface associated therewith, the base surface having a window disposed within the base surface;
one or more side walls defining a well above the base surface, the well configured to receive a vessel disposed above the base surface;
an induction coil disposed within the base, the induction coil defining
a first surface disposed below the base surface,
a second surface disposed opposite the first surface, and
an aperture disposed adjacent the window and extending from the first surface toward the second surface;
an infrared temperature sensor disposed adjacent to the window and within the aperture; and
an electronic controller electrically coupled to the infrared temperature sensor and configured to determine a compensated temperature measurement based at least in part on a material of the window, wherein the controller is configured to determine the compensated temperature measurement by applying the following algorithm: $T_{compensated} = a + (b \times T_{measured}^2)$, in which $T_{compensated}$ is the compensated temperature, a is an additive constant, b is a function of an attenuation curve with respect to frequency, and $T_{measured}$ is a temperature measurement taken by the infrared temperature sensor.

2. The induction cooking system of claim 1, wherein the window comprises polyethylene plastic.

3. The induction cooking system of claim 2, wherein the base surface comprises bulk molding compound.

4. The induction cooking system of claim 1, wherein the base surface comprises bulk molding compound.

5. The induction cooking system of claim 1, further comprising a gap between a bottom of the vessel and the base surface.

6. The induction cooking system of claim 1, wherein the vessel includes a rim protruding outward from a top portion of the vessel and configured to rest on a ledge extending around a top of the well when the vessel is disposed within the well.

7. The induction cooking system of claim 1, wherein the aperture extends from the first surface to the second surface.

8. The induction cooking system of claim 1, wherein the aperture is positioned at a center of the first surface.

9. The induction cooking system of claim 1, wherein the aperture is offset from a center of the first surface.

10. The induction cooking system of claim 9, wherein the aperture is a first aperture, and wherein the induction coil further defines a second aperture disposed at the center of the first surface.

11. The induction cooking system of claim 1, wherein the aperture is positioned midway between a center of the first surface and a periphery of the first surface.

12. The induction cooking system of claim 1, wherein the first surface and the second surface are generally circular.

13. The induction cooking system of claim 12, wherein the aperture is concentric with the first surface.

14. The induction cooking system of claim 1, wherein the infrared temperature sensor is configured to measure an amount of infrared radiation transmitted through the window.

15. The induction cooking system of claim 1, further comprising a power supply electrically coupled to the electronic controller and the induction coil, the power supply configured to provide a current supply to the induction coil.

16. The induction cooking system of claim 1, wherein the electronic controller is further configured to adjust an energy output of the induction coil based at least in part on the compensated temperature measurement.

17. An induction cooking system, comprising:
a base including a base surface associated therewith, the base surface having a window disposed within the base surface;
one or more side walls defining a well above the base surface, the well configured to receive a vessel disposed above the base surface;
an induction coil disposed within the base, the induction coil defining an aperture disposed adjacent the window;
an infrared temperature sensor disposed adjacent to the window and within the aperture; and
an electronic controller electrically coupled to the infrared temperature sensor and configured to determine a compensated temperature measurement based at least in part on a material of the window and on a temperature measurement taken by the infrared temperature sensor, wherein the controller is configured to determine the compensated temperature measurement based on a correction factor derived from attenuation contributed by the window with respect to frequency.

18. The induction cooking system of claim 17, further comprising a power supply electrically coupled to the electronic controller and the induction coil, the power supply configured to provide a current supply to the induction coil, wherein the electronic controller is further configured to adjust an energy output of the induction coil based at least in part on the compensated temperature measurement.

19. The induction cooking system of claim 17, wherein the controller is configured to determine the compensated temperature measurement by applying the following algorithm: $T_{compensated} = a + (b \times T_{measured}^2)$, in which $T_{compensated}$ is the compensated temperature, a is an additive constant, b is a function of an attenuation curve with respect to frequency, and $T_{measured}$ is the temperature measurement taken by the infrared temperature sensor.

\* \* \* \* \*